United States Patent Office 3,275,475
Patented Sept. 27, 1966

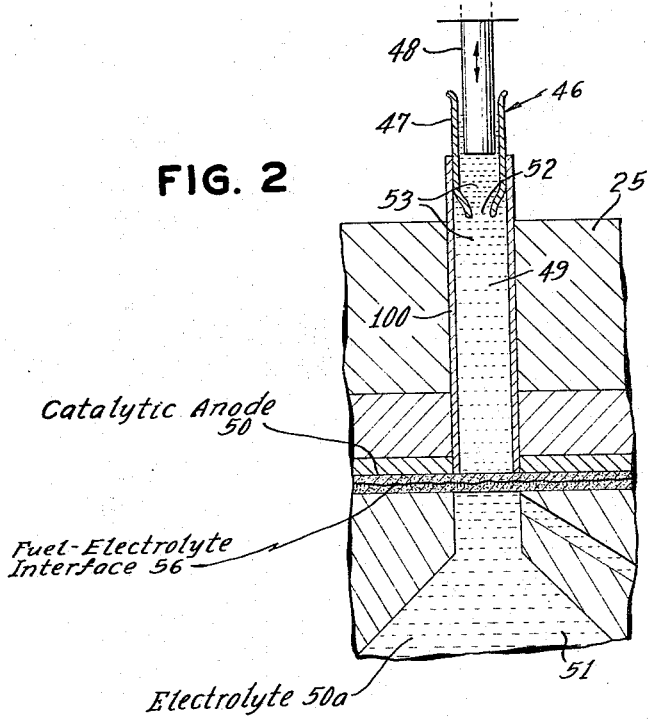
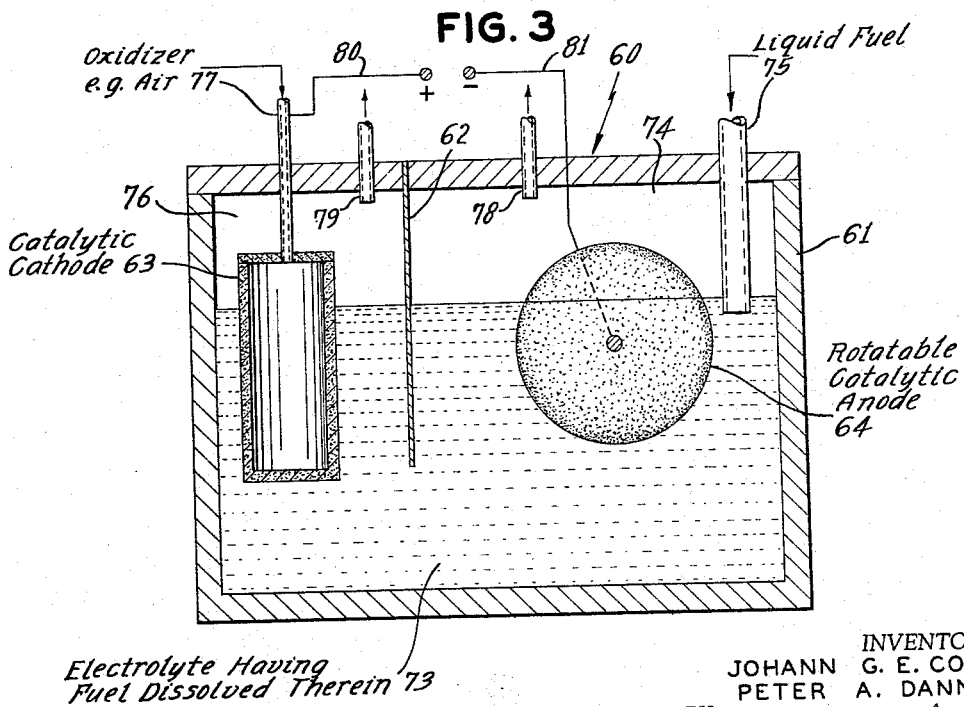

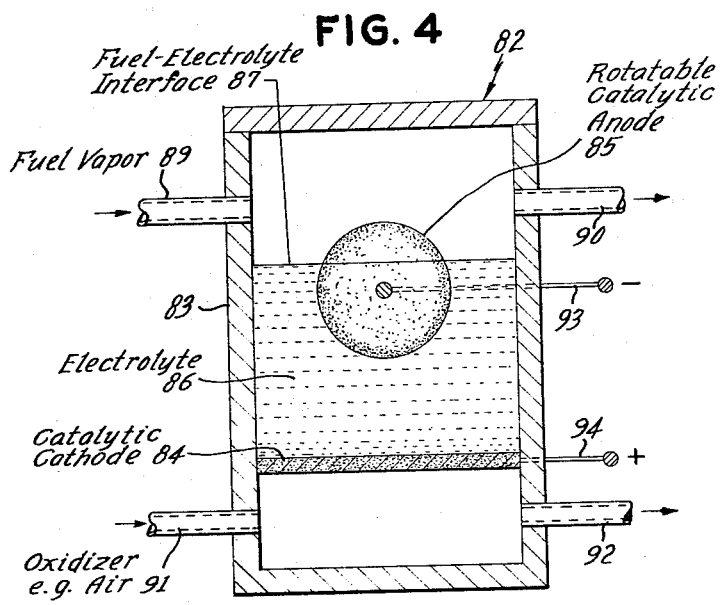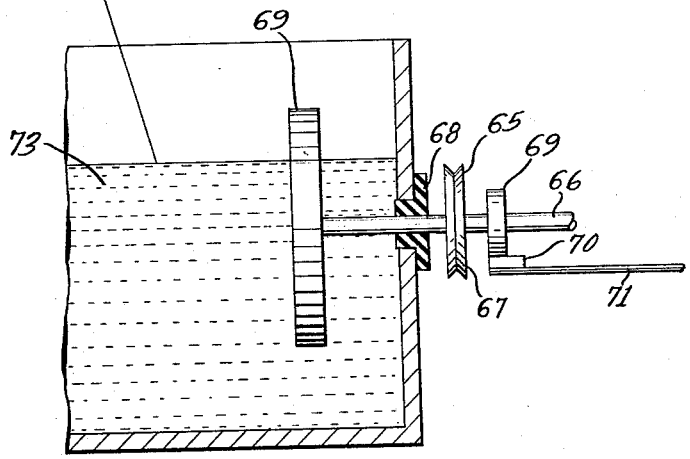

3,275,475
FUEL CELL AND METHOD OF SHIFTING THE FUEL ELECTROLYTE INTERFACE
Johann G. E. Cohn, West Orange, N.J., and Peter A. Danna, Brooklyn, N.Y., assignors to Engelhard Industries, Inc., Newark, N.J., a corporation of Delaware
Filed Sept. 13, 1962, Ser. No. 223,872
3 Claims. (Cl. 136—86)

This invention relates to electricity-producing apparatus and more especially to a new and improved process and fuel cell apparatus for the production of electrical energy.

The operation of fuel cells in the past has been accomplished by anodic polarization, i.e. loss of potential, occurring during current withdrawal from the fuel cell anode. This polarization is marked when acid electrolytes and organic fuels are used and particularly at high current densities.

In accordance with the present invention, it has been found that anodic polarization is materially reduced and optimum cell voltages as well as high current densities and cell efficiencies atained by a procedure involving contacting a catalytic anode of the fuel cell with a fuel, the anode being in contact with an electrolyte, contacting a catalytic cathode of the cell with an oxidizer, the cathode also being in contact with the electrolyte, and frequently and preferably continually contacting newly active catalyst sites of the anode with the fuel and electrolyte.

Old catalyst sites on the catalytic anode which have become deactivated are permited to recover from the polarization prior to reuse, and these newly active sites are again utilized. During their use, the old sites on the portion of the anode replaced by the portion having the newly active sites are permited to recover. The result is that regenerated newly active sites are frequently or continually available for contacting with the fuel and electrolyte, and the anodic polarization is materially reduced.

In one embodiment of the method, the newly active sites on the cataalytic anode are frequently or continually brought into contact with the fuel and electrolyte by frequently or continually shifting the fuel-electrolyte interface at the catalytic anode. This shifting of the fuel-electrolyte interface is effected by changing the pressure of the fuel relative to the electrolyte, and such changing of the pressure is accomplished either with or without the introduction of additional quantities of fuel as hereinafter disclosed.

In another embodiment, the newly active sites on the catalytic anode are frequently or continually brought into contact with the fuel and electrolyte by frequent or continual movement of a moveable catalytic anode which is only partially immersed in the electrolyte. The continual rotation of a rotatable catalytic anode with a portion of the anode being maintained out of contact with the electrolyte during the rotation is particularly effective.

The invention will be more clearly understood by reference to the following drawings wherein:

FIGURE 2 is a section through a fuel pressure-changing means for shifting the fuel-electrolyte interface at the catalytic anode;

FIGURE 3 is a schematic sectional view of another embodiment of the fuel cell of this invention;

FIGURE 4 is a schematic sectional view of still another embodiment of the fuel cell; and FIGURE 5 is a section through the rotating mechanism for rotating the anodes of the fuel cells of FIGURES 4 and 5.

Figure 1:
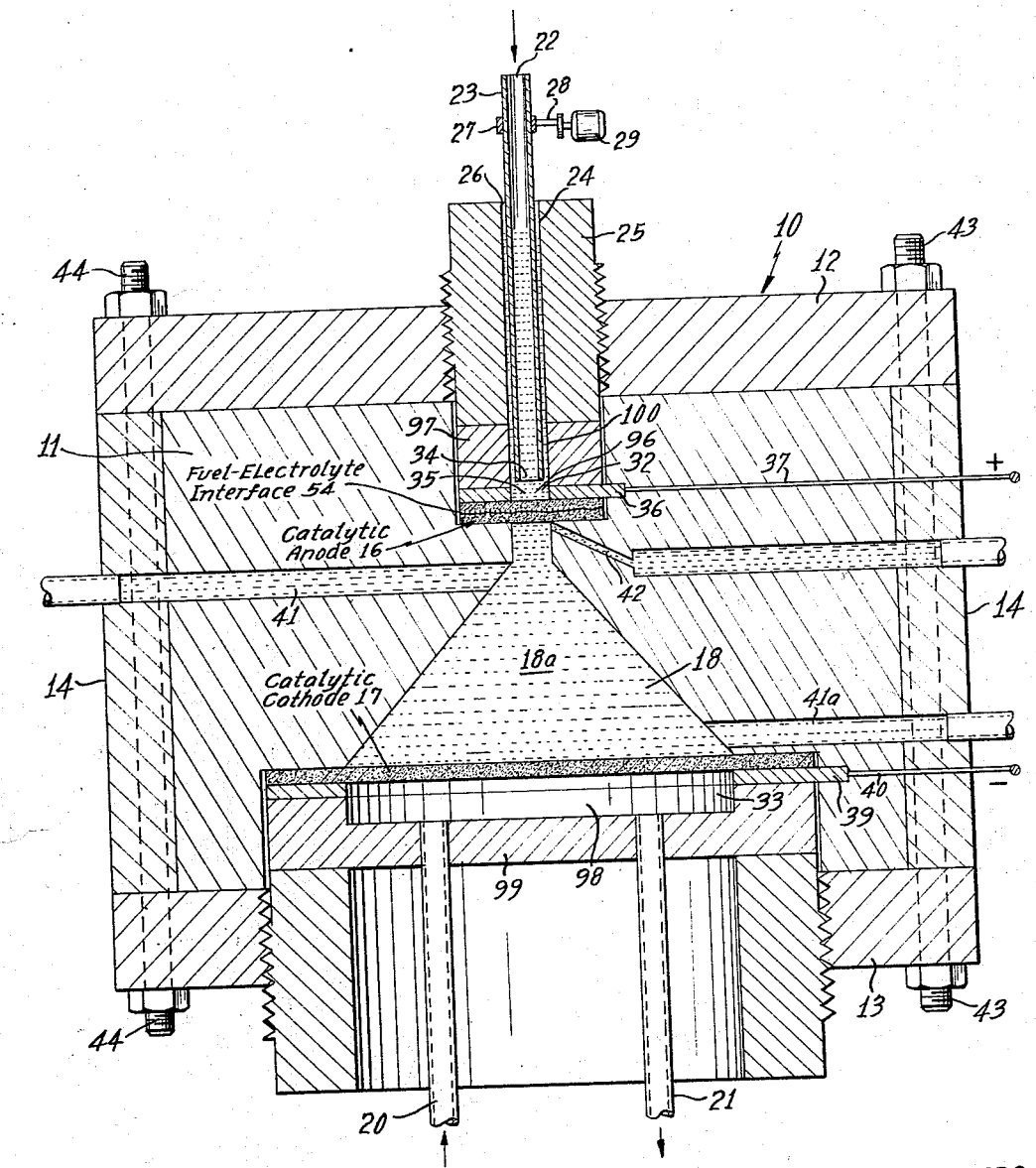
FIGURE 1 is a longitudinal section through a fuel cell of this invention.

With reference to FIGURE 1, fuel cell 10 comprises a Teflon container 11 having an outer cylindrical wall 14 and being reinforced by stainless steel end plates 12 and 13. The inner portion of container 11 is compartmented into an anode compartment 32, a cathode compartment 33 and an electrolyte chamber 18. Anode compartment 32 contains an anode 16 which comprises a circular sheet or plate-like body portion of porous material, for instance of Teflon, polyvinyl chloride, porous carbon, or porous ceramic, having deposited thereon a catalyst, for example a precious metal catalyst with the platinum group metals preferred among the precious metals. Among the platinum group metals platinum, palladium, rhodium, iridium, ruthenium or mixtures thereof, for instance platinum-ruthenium or platinum-rhodium are preferred catalysts. Nickel or cobalt are also utilizable with non-acidic electrolytes although not preferred. Fuel chamber 96 is contained within anode compartment 32 and in contact with anode 16, gold contact ring 36, Teflon ring 97, and Teflon lining 100 not shown in FIGURE 1 but indicated in the similar more detailed FIGURE 2. Housing 25 is separated from the fuel by the Teflon lining. Cathode compartment 33 contains a cathode 17 which is also a circular sheet or plate of the porous material previously disclosed. The supporting portion of cathode 17 preferably also has deposited therein a catalyst such as one or more of the catalysts previously specified with regard to anode 16. Silver with non-acidic electrolytes and gold are more favorable as cathodic catalysts than as anodic catalysts. Oxidizer chamber 98 is contained within cathode compartment 33 and in contact with cathode 17, gold contact ring 39 and Teflon piece 99.

The catalytic anode and cathode can be prepared by depositing the catalyst on the porous supporting body or carrier from a paste or suspension, by reducing or precipitating the metal from its salt solution, by electroplating, or by intimate mixing of catalyst and carrier in the form of powder and/or pastes and sintering under pressure.

Chamber 18 of fuel cell 10 has electrolyte 18a therein, for instance acid electrolyte, e.g. sulfuric acid, phosphoric acid, or aqueous solutions of salts of these acids such as, for instance potassium pyrophosphate. This electrolyte is in contact with the anode and cathode 16 and 17 respectively. Anode 16 and cathode 17 are firmly seated in the anode and cathode compartments 32 and 33 respectively thus preventing leakage of the electrolyte.

An oxidizer is supplied to oxidizer chamber 98 and cathode 17 through inlet 20 and withdrawn through outlet 21. Exemplary of the oxidizers are oxidizing gas such as atmospheric air, oxygen-enriched air, oxygen per se. Liquid oxidants such as solutions of nitrosylsulfuric acid and ceric sulfate can also be used as oxidizer instead of the oxygen-containing gas. Fuel is supplied to anode 16 through inlet 22 and inner tube 23 mounted within tubular passageway 24 of housing 25 and narrowly spaced from the housing wall, to define an annular space 26 communicating anode 16 with the exterior of the cell. Tube 23 has outlet end 34 closely spaced from the face of anode 16. Annular space 26 serves as an outlet for the reaction products from anode 16. Typical outside diameter of inner tube 23 is 2 mm. and typical inside diameter of tubular passageway 24 is 3 mm.

Any fuel suitable for fuel cells can be used in the fuel cells of this invention. Fuels which can be utilized include liquid organic materials such as alcohols, e.g. methanol, ethanol, etc., aldehydes, e.g. formaldehyde solution, and pentane; and vapor and gas phase organic fuels, e.g. methanol vapor, ethanol vapor, formaldehyde vapor, natural gas, methane, ethane, propane, and butane, as well as hydrogen, carbon monoxide and sugar.

Inner tube 23 is connected by clamp 27 to reciprocable arm 28 of motor 29. Tube 23 is reciprocated or oscillated rapidly along its longitudinal axis when motor 29 is operated, and the oscillations result in the continual changing of the pressure on the fuel 35 in the fuel chamber 96, whereby the fuel-electrolyte interface 54 in the porous catalytic anode 16 is continually shifted to reach newly active sites in the catalytic anode. Due to the close fit of the inner tube 23 in tubular passageway 24, oscillating the inner tube 23 causes a piston action to be set up whereby the liquid fuel is pushed into and drawn out of the porous anode thereby causing the fuel-electrolyte interface to change position in the porous anode 16.

Tube 23 is typically oscillated at a rate of about 30–200 oscillations per minute. After the shift to the new sites, the old sites are permitted to recover from the polarization and are subsequently re-utilized. By continual shifting of the electrolyte-fuel interface in the anode and allowance of sufficient time for depolarization of used sites in the anode, the disadvantageous effects of polarization are overcome. The result is an over-all lowering and minimizing of the polarization of the anode.

The time the fuel-electrolyte interface is maintained at a given active site in the porous anode is a function of the time of formation and of decay of anodic polarization. A preferred time for such interface to remain at a given active site is from about 0.005–100 seconds.

Gold contact ring 36 is in electrical contact with the catalyst of catalytic anode 16 and gold wire 37 serves to conduct the direct current electricity from anode 16. A good contact ring 39 is also in electrical contact with the catalyst of catalytic cathode 17, and a gold wire 40 leads to contact ring 39. In place of gold contact rings 36 and 39 and gold wires 37 and 40, electrically conductive members and wires of other suitable electrically conductive materials could be employed.

Channels 41 and 41a are provided in fuel cell 10 for the purpose of circulating the main body of the electrolyte if desire. Capillary tube 42 is also provided for flow of electrolyte for the reference electrode connection. The reference electrode was a saturated calomel electrode dipping into a large reservoir of a saturated aqueous solution of potassium chloride. Capillary tube 42 was also in contact with this reservoir thereby causing an ionic path to exist between the anode 16 and the saturated calomel electrode. Measurements of anode potential vs. a standard potential were then possible. Bolts 43 and 44 of stainless steel are threaded at both of their ends and pass through openings in end plates 12 and 13 of casing or container 11, these bolts being provided with nuts at each of their threaded ends for purpose of holding the end plates against casing or container 11.

With reference to FIGURE 2 showing another embodiment of the means for shifting the fuel-electrolyte interface 56 to reach newly active sites in the catalytic anode, fuel injection means in the form of a syringe 46 having housing or casing 47 and plunger 48 reciprocable therein is mounted at the upper end of tubular fuel passageway 49. As shown, syringe 46 is wedged securely into the upper end of passageway 49. The porous catalytic anode 50 is disposed at the lower end of passageway 49 in contact with electrolyte 50a in electrolyte chamber 51. An inner tube is not present within the tubular passageway 49 in this embodiment as in the embodiment of FIGURE 1. However, with this exception, the remainder of the fuel cell is substantially identical to that of FIGURE 1. Syringe 46 contains liquid fuel 53 as does tubular passageway 49 which is filled with the liquid fuel, Teflon lining 100 separates the fuel from housing 25, and periodic movement of the plunger 48 of the syringe to force the fuel through the outlet 52 of the syringe causes a pressure change on the fuel within the tubular passageway 49 whereby the fuel is forced back and forth within the porous anode 50. The result is a shifting of the fuel-electrolyte interface within the porous catalytic anode 50 to reach newly active catalyst sites, whereby anodic polarization is materially lowered.

The fuel-electrolyte interface can also be shifted at the catalytic anode by maintaining such interface stationary or substantially so, and moving or shifting the catalytic anode so that the fuel-electrolyte interface reaches new sites. In a suitably designed cell the anode may be so connected as to have an oscillating action in the electrolyte. Also, such shifting of the fuel-electrolyte interface may be accomplished by use of a rotating anode, according to the embodiment of FIGURES 3, 4, and 5.

Referring now to FIGURE 3, fuel cell 60 comprises container 61 having a gas-impervious separator 62 therein, for instance a cation exchange membrane for preventing the oxygen supplied to the cathode 63 from reaching the anode 64. Cathode 63 is a stationary, i.e. immovable, hollow porous electrode and is of platinum black on porous carbon. Anode 64 is a rotable anode mounted partially within and partially without the electrolyte, and is constituted of platinum black deposited on a carbon disc. The rotating mechanism for anode 64, shown in FIGURE 5, includes metallic drive pulley 65 mounted on metallic rotable shaft 66, and a belt (not shown) positioned about and in the V-groove 67 of pulley 65 and extending to the drive wheel of an electric motor. Shaft 66 is of a material not corroded by the acid electrolyte, for instance Teflon-coated stainless steel or titanium. An insulating bushing is designated at 68. A metallic contact wheel 69 is mounted on shaft 66, and metallic contact member 70 is in contact with contact wheel 69. Conductor wire 71 is connected to and leads from contact member 70 for withdrawal of electrical current therefrom.

Referring again to FIGURE 3, an electrolyte 73 which is 3 N $H_2SO_4$ has liquid fuel dissolved therein, for instance methanol. In operation, the liquid methanol is fed into the anode compartment 74 directly into the electrolyte 73 therein through supply conduit 75, and an oxygen-containing gas, for instance air, is fed into the porous cathode in cathode compartment 76 through metallic conducit 77. The products of the electrochemical oxidation of the fuel, carbon dioxide and perhaps water vapor, are vented from the anode compartment through discharge outlet 78. Excess gases, nitrogen, excess $O_2$ etc., are vented from cathode compartment 76 through discharge outlet 79. Electrical conductors 80 and 81 are electrically connected to cathode 63 and anode 64 respectively.

Anode 64 is rotated continually by means of the rotating mechanism of FIGURE 5 so that a portion of the catalytic anode is at all times out of contact with the fuel and electrolyte and this polarized portion is permitted to depolarize or recover, so that when such portion is again contacted with the fuel and electrolyte newly active catalyst sites are available and this portion will give optimum performance. By continual rotation of the catalytic anode, the catalyst sites on a portion of the anode are at all times permitted to recover, and hence regenerated newly active catalyst sites will continually be available. The periods of polarization and recovery will differ depending upon the particular system under consideration. However, the contact time and recovery time can be adjusted for a given cell, for example, by varying the speed of rotation or the depth of partial immersion of the anode in the electrolyte. Anode 64 and anode 85 of the fuel cells of respectively FIGURES 3 and 4 hereafter referred to can be of various shapes, for instance it can be disc-like as shown or it can have spokes, be doughnut shaped, etc.

With reference now to FIGURE 4 showing a fuel cell for use with vapor phase fuels, fuel cell 82 comprises container 83 having stationary or immoveable cathode 84 constituted of platinum black on carbon and rotatable catalytic anode 85 rotated by rotating means similar to that of FIGURE 5. Specifically anode 85 is a rotatable porous carbon disc having platinum black deposited thereon, and is partially immersed in electrolyte 86, which is 3 N $H_2SO_4$. The electrolyte extends up to level 87 in the container, so that rotatable anode 64 is only partially immersed in the electrolyte. Methanol vapor carried on a nitrogen stream is fed into the cell through inlet 89 and carried to the rotating anode and the electrolyte. The products of the electrochemical oxidation are removed through outlet 90. Air or other oxygen-containing gas is supplied into the cell through inlet 91 for contacting the cathode 84, and the nitrogen and excess oxygen is vented through outlet 92. Electrical conductors 93 and 94 are connected to anode and cathode 85 and 84 respectively for withdrawal of current. By reason of rotating anode 85 and hence continually bringing regenerated newly active catalyst sites into contact with the fuel and electrolyte, anodic polarization is materially reduced and optimum cell voltages attained.

Exemplary of electrolytes utilized in the present invention are aqueous solutions of sulfuric acid and phosphoric acid. Further, solutions of a salt of an acid and a base can be used as electrolyte, for instance $K_2SO_4$, $MgSO_4$ or $KH_2PO_4$. While not preferred, alkaline electrolytes could also be used, for instance KOH or NaOH.

The invention will be further illustrated by reference to the following example. In the example the anode potentials are reported vs. a standard hydrogen electrode. The signs are given in accordance with the Stockholm Convention.

EXAMPLE

The purpose of this example is to show that the polarization of an anode can be lowered by change of pressure or fuel concentration in the anode compartment.

In this example a fuel cell having a single anode was used. The anode was positioned in between the electrolyte compartment containing $H_2SO_4$ and the fuel compartment. The cell had an oversized oxygen cathode with a geometrical surface area 100 times larger than the geometrical surface area of the anode so that any change in cell voltage was caused by change in the anode potential. All electrodes were porous discs of Pt carried on spongy "Teflon."

In Test A the fuel compartment consisted of a container housing an inner tube, so designed that the inner tube could be oscillated to and from the anode. The fuel compartment contained a methanol-free aqueous solution of 37 percent formaldehyde. The electrolyte was 3 N $H_2SO_4$. Because of the close fit of the inner tube in the outer fuel container, oscillating the inner tube caused a piston action to be set up whereby fuel was pushed into and drawn out of the porous anode thereby causing the fuel-electrolyte interface to change position in the porous anode.

In Test A, on open circuit, the anode potential vs. a standard hydrogen potential was observed to be +0.34 volt at 26° C. The cell voltage was 0.72 volt. At a current density of 12.5 ma./cm.$^2$ and a temperature of 26° C., the results tabulated in Table I were obtained.

TABLE I—TEST A

| Cumulative Time (Minutes) | Current Density (ma./cm.$^2$) | Anode Potential (Volts) | Cell Voltage (Volts) |
|---|---|---|---|
| 0 | 12.5 | | |
| 2 | 12.5 | +0.84 | 0.16 |
| 10 | 12.5 | +0.88 | 0.12 |
| 25 | (1) | | |
| 30 | 12.5 | +0.60 | 0.40 |
| 43 | (1) | | |
| 45 | 12.5 | +0.50 | 0.50 |

[1] Inner tube oscillated a few times.

After the 45 minute reading the inner tube was oscillated continuously for about one minute. At the end of this 46 minute period an anode potential of +0.14 volt was observed. The current density was observed to increase to 100 ma./cm.$^2$ and the cell voltage to >0.80 volt. Further oscillation of the tube failed to improve these values. After stopping the oscillation the values remained essentially constant for approximately 2 minutes before deterioration was observed.

The data of Test A show that at a current density of 12.5 ma./cm.$^2$, the anode potential improved on changing the pressure in the anode compartment. It can be seen that the anode potential under load improved to a value better than that of the open circuit potential.

An improvement in anode potential was also observed in Test B which was at elevated temperature. In Test B methanol was used as the fuel. The methanol was alternately delivered as a vapor and a liquid. For the vapor feed, the vapor (16% by volume methanol on carbon dioxide) was delivered through the inner tube shown in FIGURE 1. A hypodermic syringe was used for liquid feed. For the liquid feed excluding air, the inner tube was replaced by a hypodermic syringe mounted in the mouth of the fuel compartment. The hypodermic syringe was positioned as shown in FIGURE 2. The hypodermic syringe provided a means to inject the liquid fuel into the anode compartment without the admission of air. The data of Test B are tabulated in Table II.

TABLE II—TEST B.—ANODIC OXIDATION OF METHANOL ON PLATINUM BLACK AT ELEVATED TEMPERATURE

[1 N Sulfuric Acid. Anode Potential vs. Standard Hydrogen Electrode. Fuel 16 Vol. Percent Methanol Vapor, 84% Carbon Dioxide]

| Cumulative Time (Minutes) | Temp., ° C. | Current Density (ma./cm.$^2$) | Anode Potential (Volts) | Cell Voltage (Volts) | Remarks |
|---|---|---|---|---|---|
| 0 | 60 | 0 | +.21 | .85 | 55 cc./Min. feed gas. |
| 20 | 63 | 100 | +.70 | .14 | Do. |
| 45 | 78 | 50 | +.61 | .32 | |
| 55 | 82 | 50 | +.61 | .32 | Approx. .5 cm.$^3$ liquid $CH^3OH$ to anode. |
| 65 | 83 | 50 | +.59 | .34 | No gas flow. |
| 95 | 90 | 50 | +.57 | .36 | |
| 135 | 103 | 50 | +.56 | .36 | Resumed feed gas flow. |
| 155 | 64 | 50 | +.61 | .30 | Approx. 4 cm.$^3$ $CH^3OH$ to anode. No gas flow. Very rapid potential improvement begins. |
| 170 | 60 | 50 | +.10 | .80 | First reading taken after improvement. |
| 173 | 60 | 50 | +.13 | .92 | |

The data of Tests A and B of Tables I and II respectively show the improvement in a fuel cell operating under load produced by change of conditions in the anode compartment, where such change of condition caused a shifting of the electrolyte-fuel interface in the anode. By continual shifting of such interface and allowance of sufficient time for recovery of used sites in the anode, the disadvantageous effects of polarization are overcome. Such depolarization techniques are utilized to operate a cell to give optimum cell voltage.

It will be obvious to those skilled in the art that many modifications may be made within the scope of the present invention without departing from the spirit thereof, and the invention includes all such modifications.

What is claimed is:

1. A process for the improved operation of a fuel cell to produce electrical energy, which comprises contacting a porous catalytic anode of the fuel cell with an organic fuel, the anode being in contact with an acid electrolyte, contacting a porous catalytic cathode of the cell with an oxidizer, the cathode also being in contact with the electrolyte, and continually shifting the fuel-electrolyte interface within the porous anode to contact newly active catalyst sites within the anode whereby anodic polarization is materially reduced by oscillating a fuel feed tube containing the fuel and having its outlet end immersed in the porous anode contacting fuel and being closely spaced from a face of the porous catalytic anode.

2. A fuel cell comprising a container, a porous catalytic anode in the container, a porous catalytic cathode in the container spaced from the anode, an acid electrolyte contacting the anode and cathode, means for maintaining an organic liquid fuel in contact with the anode, means for passing an oxidizer in contact with the cathode, and means for frequently changing the pressure of the fuel relative to the electrolyte thereby frequently shifting a fuel-electrolyte interface in the porous catalytic anode to reach newly-active catalyst sites in the anode, whereby anodic polarization is materially reduced, and wherein the pressure changing means comprises an inner fuel feed tube disposed within an outer tubular passage of the container and closely spaced therefrom, the outlet end of the inner tube being closely spaced from a face of the porous catalytic anode, and means for rapidly oscillating the inner tube within the outer tubular passage.

3. The fuel cell of claim 2 wherein the catalyst of the anode and cathode is a platinum group metal.

References Cited by the Examiner
UNITED STATES PATENTS

| 852,464 | 5/1907 | Sokal | 136—160.3 |
| 1,106,719 | 8/1914 | Lake | 136—160.2 |
| 2,925,454 | 2/1960 | Justi et al. | 136—86 |
| 3,092,516 | 6/1963 | Rightmire | 136—86 |

WINSTON A. DOUGLAS, *Primary Examiner.*
ALLEN B. CURTIS, *Examiner.*